(12) United States Patent
Underwood

(10) Patent No.: US 10,816,943 B2
(45) Date of Patent: Oct. 27, 2020

(54) USER CONTROL INTERFACE

(71) Applicant: IFPL Group Limited, Calbourne, Isle of Wight (GB)

(72) Inventor: Geoffrey Paul Underwood, Calbourne (GB)

(73) Assignee: IFPL Group Limited, Calbourne, Isle of Wight (GB)

( * ) Notice: Subject to any disclaimer, the term of this patent is extended or adjusted under 35 U.S.C. 154(b) by 388 days.

(21) Appl. No.: 14/365,400

(22) PCT Filed: Dec. 12, 2012

(86) PCT No.: PCT/GB2012/053109
§ 371 (c)(1),
(2) Date: Jun. 13, 2014

(87) PCT Pub. No.: WO2013/088143
PCT Pub. Date: Jun. 20, 2013

(65) Prior Publication Data
US 2014/0350701 A1    Nov. 27, 2014

(30) Foreign Application Priority Data

Dec. 13, 2011  (GB) .................................. 1121409.5

(51) Int. Cl.
| | |
|---|---|
| *G05B 15/02* | (2006.01) |
| *H01R 9/24* | (2006.01) |
| *H01R 31/00* | (2006.01) |
| *H01R 25/00* | (2006.01) |
| *H01R 13/514* | (2006.01) |

(52) U.S. Cl.
CPC ........... *G05B 15/02* (2013.01); *H01R 9/2408* (2013.01); *H01R 13/514* (2013.01); *H01R 25/003* (2013.01); *H01R 31/005* (2013.01)

(58) Field of Classification Search
USPC ........................... 700/83; 439/151, 212, 284
See application file for complete search history.

(56) References Cited

U.S. PATENT DOCUMENTS

| | | | |
|---|---|---|---|
| 4,739,451 A | | 4/1988 | Kuba |
| 6,137,686 A | * | 10/2000 | Saye ..................... G06F 1/1626 361/679.43 |
| 6,585,201 B1 | * | 7/2003 | Reed ................... B60R 11/0235 248/181.1 |

(Continued)

FOREIGN PATENT DOCUMENTS

| | | |
|---|---|---|
| JP | 2001325061 | 11/2001 |
| WO | WO/2001/004764 | 1/2001 |

*Primary Examiner* — Emilio J Saavedra
(74) *Attorney, Agent, or Firm* — Royal W. Craig; Gordon Feinblatt LLC

(57) ABSTRACT

A user control interface (1), the interface comprising a host module (2) and a first user module (3), the first user module arranged to provide to the user at least one input and/or output functionality in relation to equipment external to the interface, the host module and the first user module are operatively detachably connectable, and the first user module arranged to allow a second user module (4) to be operatively connected thereto, the first module arranged to provide signal communication between the host module and the second user module, and the host module arranged to provide a connection for enabling communication externally of the interface.

17 Claims, 2 Drawing Sheets

(56) References Cited

U.S. PATENT DOCUMENTS

| | | | |
|---|---|---|---|
| 6,716,047 B2* | 4/2004 | Milan | G06F 13/4095 361/731 |
| 2003/0059020 A1* | 3/2003 | Meyerson | H04L 51/36 379/219 |
| 2003/0135681 A1* | 7/2003 | Laity | G06F 13/385 710/303 |
| 2004/0171312 A1 | 9/2004 | Sichner et al. | |
| 2005/0268319 A1* | 12/2005 | Brady, Jr. | B60N 2/4693 725/76 |
| 2012/0039048 A1* | 2/2012 | Mondragon | B64D 11/0015 361/733 |

\* cited by examiner

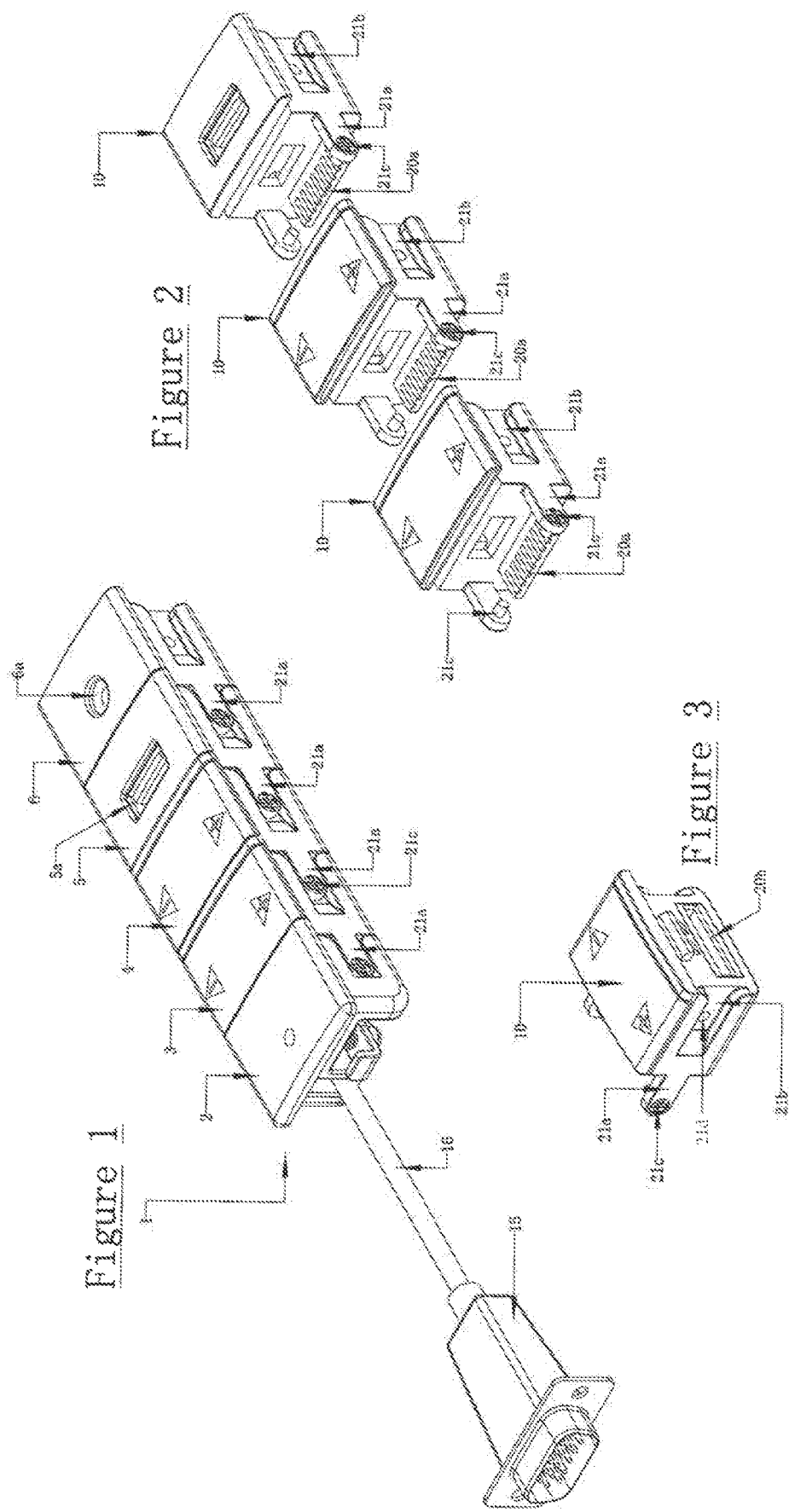

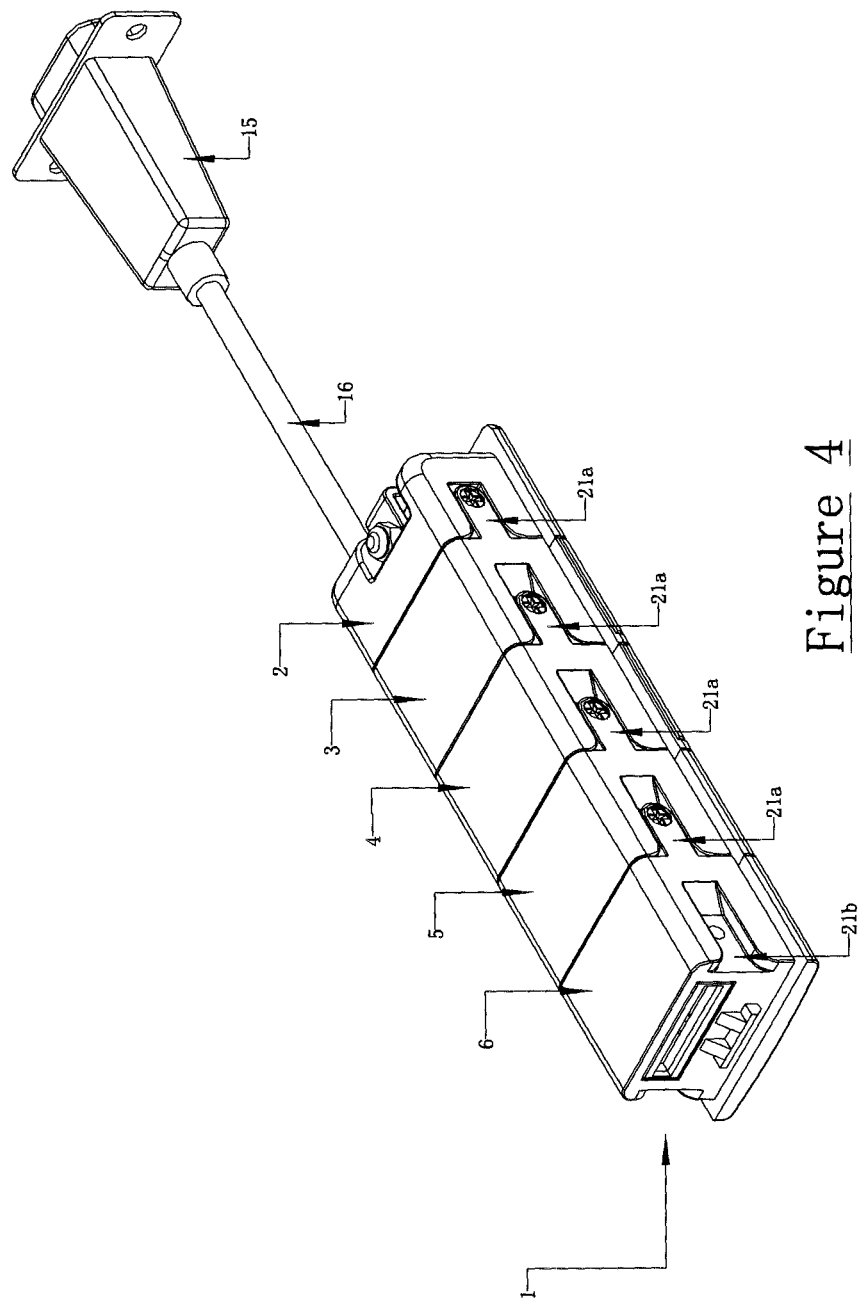

1

USER CONTROL INTERFACE

TECHNICAL FIELD

The present invention relates to a user control interface, in particular, although not exclusively, to enable at-seat functionality.

SUMMARY

According to the present invention there is provided a user control interface, the interface comprising a host module and a first user module, the first user module arranged to provide to the user at least one input and/or output functionality in relation to equipment external to the interface, the host module and the first user module are operatively detachably connectable, and the first user module arranged to allow a second user module to be operatively connected thereto, the first module arranged to provide signal communication between the host module and the second user module, and the host module arranged to provide a connection for enabling communication externally of the interface.

The host module, the first user module and the second user module are preferably connectable in series.

The interface is preferably capable of providing at-seat functionality to the user.

The host module preferably arranged to serve as a bus or hub for the first and second user modules to enable communication externally of the interface therewith.

The first user module preferably comprises a first connector to enable connection to the host module and a second connection to enable connection to the second user module, the first connector and the second connector provided at opposite ends of the first module.

The host module preferably arranged to be the endmost module of the interface.

The host module and the first user module, and the first user module and the second user module preferably arranged to be operatively connectable to each other by way of an electrical plug and socket arrangement.

The user control interface is preferably arranged to issue control signals to equipment external of the interface.

The interface is preferably arranged to be mountable at or adjacent to a seat. For example, the interface may be arranged to be fixed in a seat, tethered to a seat (for example by wiring), or to be untethered (and be capable of receiving and sending signals over an air interface). The interface may be arranged to be mountable in an armrest of a seat.

The host module may include a signal processor to process signals to and/or from the user modules.

The user interface may be a passenger interface for installation in a vehicle or craft. The user interface may comprise a user entertainment interface. The user interface is preferably an in-flight or onboard passenger entertainment system interface. Alternatively, the user control interface may be suitable for domestic use in the form of a remote control, wherein additional user modules can be added depending on the type and/or number of media sources (or indeed other external devices) that the user wishes to control.

Preferably each user module provides a respective input and/or output functionality. Preferably each module comprises a dedicated functionality, modules may comprise multiple functionalities.

The functionality provided by the modules preferably includes user operable controls or a user equipment interface.

2

Preferably the modules are of complimentary dimensions. Preferably the modules have substantially the same width dimension.

The host module is preferably arranged to communicate with equipment external of the user interface.

The user control interface may be viewed as a passenger control unit.

BRIEF DESCRIPTION OF THE DRAWINGS

Various embodiments of the invention will now be described, by way of example only, with reference to the following drawings in which:

FIG. 1 is a perspective view of a user interface in an assembled condition;

FIG. 2 is a perspective view of a user interface in a disassembled condition;

FIG. 3 is a perspective view of a user module; and

FIG. 4 shows a perspective underside view of an assembled user control interface.

DETAILED DESCRIPTION

With reference to FIG. 1 there is shown a user control interface for use by passengers for an in-flight entertainment system and for other functionality which is made available to the passengers. As will be described below the interface comprises a plurality of modules which are detachably connectable. Each user module provides a particular functionality, and more specifically an input and/or output functionality. The user interface 1 is arranged to be mounted at or close to a passenger seat, such as in an armrest of a passenger seat.

The user interface 1 comprises a host module 2 and a plurality of user modules 3, 4, 5 and 6.

The host module 2 serves as a hub for signals to and from each of the user modules. Accordingly, the host module 2 comprises a connector 15 which is attached to a cable 16. The connector 16 is connectable to onboard circuitry which connects to equipment external of the user interface 1. Such equipment may comprise an onboard passenger entertainment system which provides audio and visual data to a passenger's seat. The external equipment may allow control for the passenger's immediate environment such as lighting, temperature and ventilation. The external equipment may comprise communication equipment to allow a passenger to communicate with staff onboard, to contact make a telephone call or to obtain internet access.

The host module 2 comprises a housing, one end of which is provided with an electrical connector which allows the host module to be operably connected to a user module. The electrical connector may comprise a male or female connector component. In the example shown, the connector comprises a socket to receive a plug component of an adjacent user module. As will be described in more detail below, the host module 2 comprises a plurality of electrical pin receivers, each of which relates to signals tofrom a particular user module. It will be appreciated, however, that a particular group of pins may be assigned to a particular user module. The host module 2 may comprise a signal processor to suitably process signals en route to/from the user modules.

Reference is now made to FIGS. 2 and 3 which illustrates the way in which the user modules and the host module are connectable together. FIG. 2 shows generic user modules 10, which at one end comprise an electrical connector 20a and a plurality of limbs 21a. At the opposite end of each user module, there is provided a connector 20*b* and channels 21*b* having apertures 21*d*. In use, the connector 20*a* and the limbs 21*a* of one module are receivable in the socket 20*b* and the side recesses/channels 21*b* respectively. The (electrical) connectors 20*a* and 20*b* serve to allow both signals to be sent and received to the particular module, and in the case of an intermediate user module also serve to provide signal communication between a user module and the host module. The limbs 21*a* and the complimentary side recesses/channels 21*b*, in conjunction with a suitable fastener arrangement, allow the modules to be securely attached together, one next to the other. The limbs 21*a* are each provided with a threaded fastener 21*c* which is received within a respective aperture 21*d* of the recess/channel 21*b*.

As will now be evident, any number and/or combination of user modules can be connected together to form the user interface 1. When connected together the modules form a series of directly interconnected entities embodied as what may be termed as a horizontal 'stack'. User control interfaces can thus be easily and quickly assembled to achieve any desired functionality. For example, the seats in a higher class cabin of an aircraft may be provided with more functionality (for example more user modules) as compared to the functionality provided by the user interfaces provided in a lower class cabin. In the example shown in FIG. 1, the user module 3 is a passenger entertainment system channel control, the user module 4 is a passenger entertainment system volume control, the user module 5 provides the functionality of a jack or socket 5*a* for a passenger headset and the user module 6 provides a USB socket 6*a* for connection a passenger's equipment.

In general terms, the output functionality which could be provided by the user modules includes:
Volume up/down
Channel up/down
Brightness
Display on/off
Attendant call/call cancel
Reading light
Video controls—play, pause, fast-forward, rewind, stop, etc
Seat setting controls—e.g. recline, lumbar, etc
Keypad-numeric
Keyboard-alphabetical
Cursor control
  From an output point of view, the following functionality could be provided:
Headset audio connectors
USB socket
RJ45 socket
Phono/RCA socket
VGA socket
HDMI socket
Digital media player connector
Power socket
  Others:
Bluetooth®
Near field communications
Chip and pin reader
  Not only, as discussed above, does the user interface 1 allow extensive versatility as to the combinations/permutations of user modules capable of being assembled, in the event that a particular user module becomes damaged or ceases to function correctly, the damaged/faulty module can easily be replaced for a replacement user module, without the need to replace the entire user control interface (i.e. without the need to replace any of the other modules).

It will be appreciated that the modules have substantially the same lateral dimension and so that they are advantageously complimentary to one another when interconnected.

In an alternative embodiment, instead of use of a dedicated line or pin (of HDMI) for the signals of a particular user module, the modules may be interconnected by (a two line) digital connection, and in which a particular protocol (such as USB) is used to distinguish between signals to and from respective user modules. Such an arrangement advantageously overcomes any constraint caused by the finite number of wires. It will be appreciated, however, that the user control interface may employ any suitable wireless communication means, such as Bluetooth®, WiFi®, infrared etc.

It will be appreciated that although particular mention has been made of application to installation in aircraft, the user interface also finds application in relation to other forms of transportation such as, but not limited to, trains, buses and coaches. The user control interface may also be arranged for use in a domestic or office environment. In those contexts, it may be embodied as a remote control, for example to various external media equipment which the user can control.

The invention claimed is:

1. A modular passenger interface configured to be installed fixed to a vehicle seat for providing user input and output to/from a passenger entertainment system, said passenger interface including:
  a host module electrically connected to said passenger entertainment system for transmitting signals to and from any one of a plurality of user modules; and
  a first user module configured to be mechanically and electrically connected to said host module, the host module and the first user module being operatively detachably connectable; and
  a second user module configured to be mechanically and electrically connected to said first user module;
    wherein one of the first user module and the second user module comprise a human input device with a user-operable control configured to allow a direct manual user control input corresponding to one function of said passenger entertainment system, and the other of said first user module and the second user module comprise a power output socket; and
    wherein the power output socket is incorporated in an outward surface of at least one of the first user module and the second user module, and both the first and second user modules have a substantially same width, wherein the user-operable control comprises a button or switch and said function of the user-operable control comprises one of: volume up/down, channel up/down, display brightness, display on/off, attendant call/call cancel, reading light, video controls, seat setting controls, numeric keypad, alphabetical keypad, and cursor control.

2. An interface as claimed in claim 1, wherein the host module, the first user module and the second user module are connectable in series.

3. An interface as claimed in claim 2 in which the interface is capable of providing at-seat functionality to the user.

4. An interface as claimed in claim 1 in which the host module is arranged to serve as a bus or hub for the first and second user modules to enable communication externally of the interface therewith.

5. An interface as claimed in claim 1 in which the first user module comprises a first connector to enable connection to the host module and a second connector to enable connection to the second user module, the first connector and the second connector provided at opposite ends of the first module.

6. An interface as claimed in claim 1 in which the host module is arranged to be the endmost module of the interface.

7. An interface as claimed in claim 1 in which the host module and the first user module, and the first user module and the second user module are arranged to be operatively connectable to each other by way of an electrical plug and socket arrangement.

8. An interface as claimed in claim 1 in which the user control interface is arranged to issue control signals to equipment external of the interface.

9. An interface as claimed in claim 1, which is arranged to be mountable in an armrest of a passenger seat.

10. An interface as claimed in claim 1 wherein the host module includes a signal processor to process signals to and/or from the first user module, and said second user module.

11. An interface as claimed in claim 1 in which the user-operable control further comprises a volume control.

12. An interface as claimed in claim 1 in which said first user module comprises any one from among the group consisting of a volume control, a channel control, a brightness control, and an on/off control.

13. An interface as claimed in claim 1 in which the modules are of complimentary dimensions.

14. An interface as claimed in claim 13 in which the modules have substantially the same width dimension.

15. An interface as claimed in claim 1 in which the host module is arranged to communicate with equipment external of the user interface.

16. An interface as claimed in claim 1 in which the user control interface is a passenger control unit.

17. An interface as claimed in claim 1 in which the user-operable control further comprises a channel control.

* * * * *